(12) United States Patent
Soltermann

(10) Patent No.: US 9,776,841 B2
(45) Date of Patent: Oct. 3, 2017

(54) LIFTING COLUMN

(71) Applicant: Marcel Soltermann, St. Pantaleon (CH)

(72) Inventor: Marcel Soltermann, St. Pantaleon (CH)

(73) Assignee: AKTIEBOLAGET SKF, Gothenberg (SE)

( * ) Notice: Subject to any disclaimer, the term of this patent is extended or adjusted under 35 U.S.C. 154(b) by 237 days.

(21) Appl. No.: 14/568,797

(22) Filed: Dec. 12, 2014

(65) Prior Publication Data

US 2015/0175392 A1 Jun. 25, 2015

(30) Foreign Application Priority Data

Dec. 19, 2013 (DE) .................. 10 2013 226 754

(51) Int. Cl.
*F16H 25/20* (2006.01)
*B66F 3/10* (2006.01)
*B66F 3/44* (2006.01)

(52) U.S. Cl.
CPC .................. *B66F 3/10* (2013.01); *B66F 3/44* (2013.01); *F16H 25/2056* (2013.01); *F16H 2025/2053* (2013.01); *F16H 2025/2059* (2013.01); *F16H 2025/2062* (2013.01); *F16H 2025/2078* (2013.01); *Y10T 74/18664* (2015.01)

(58) Field of Classification Search
CPC ......... F16H 2025/2078; F16H 25/2056; F16H 2025/2053; F16H 2025/2059; F16H 2025/2062; B66F 3/10

USPC ................ 74/89.34, 89.35; 254/98, 102, 424
See application file for complete search history.

(56) References Cited

U.S. PATENT DOCUMENTS

| 3,161,074 A | 12/1964 | Korthaus et al. |
| 4,635,492 A * | 1/1987 | Uebelhart ................ A47B 9/20 248/405 |
| 6,880,416 B2 | 4/2005 | Koch |
| 2013/0304021 A1* | 11/2013 | Cabiri ................ A61M 5/31511 604/506 |

FOREIGN PATENT DOCUMENTS

| DE | 3505842 A1 | 8/1985 | |
| DE | 9319978 U1 * | 2/1994 | ............... A47C 3/24 |
| DE | 19608171 A1 | 9/1997 | |
| DE | 10018742 A1 | 10/2001 | |
| DE | 102005044131 A1 | 3/2007 | |
| DE | 102008060043 B | 7/2010 | |

(Continued)

*Primary Examiner* — William C Joyce
*Assistant Examiner* — Randell J Krug
(74) *Attorney, Agent, or Firm* — Bryan Peckjian; SKF USA Inc. Patent Dept.

(57) ABSTRACT

A lifting column includes a component having an internal thread, as well as a hollow shaft having an external thread, which is in engagement with the internal thread of the component. A threaded spindle is disposed inside the hollow shaft and has an external thread, which is in engagement with an internal thread of the hollow shaft. Furthermore, the lifting column includes a drive device configured to rotate the hollow shaft relative to the threaded spindle and the component. When the hollow shaft rotates, the component and the hollow shaft move in the same axial direction so that the height of the lifting column is changeable.

18 Claims, 3 Drawing Sheets

(56) References Cited

FOREIGN PATENT DOCUMENTS

| DE | 102008060043 B3 | 7/2010 |
|---|---|---|
| DE | 102010052918 A1 | 5/2012 |
| EP | 1230872 A1 | 8/2002 |
| FR | 2655634 A1 | 6/1991 |

* cited by examiner

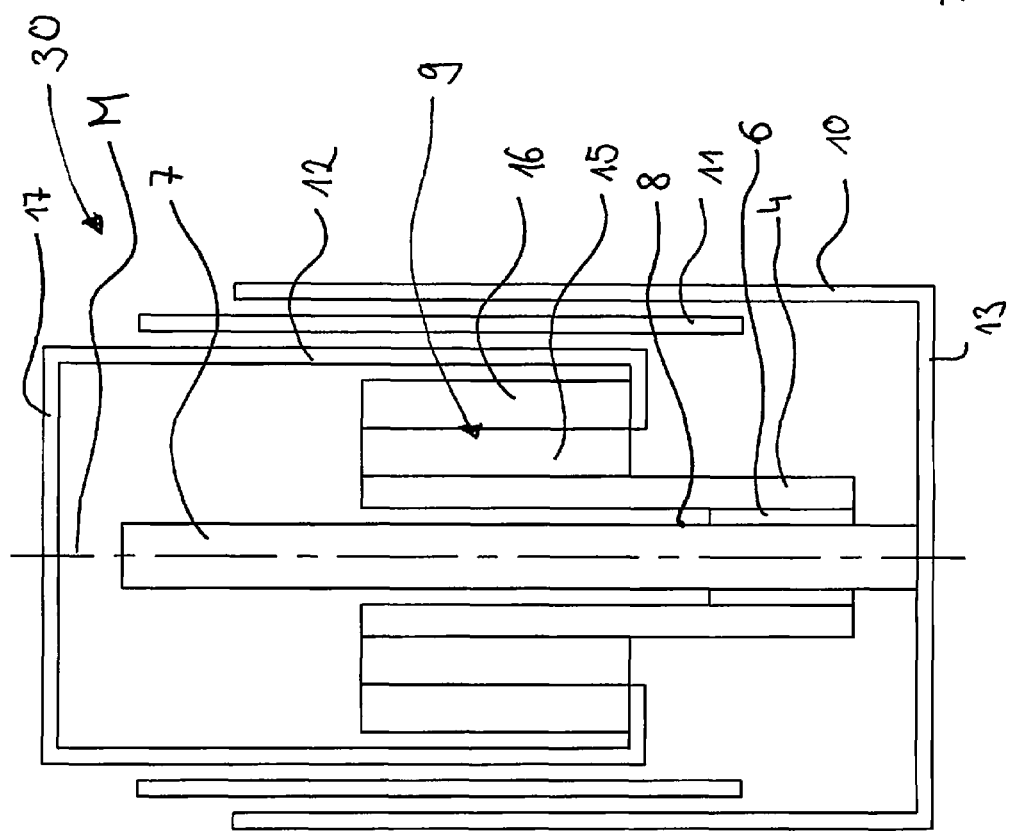

LIFTING COLUMN

CROSS-REFERENCE TO RELATED APPLICATION

This application claims priority to German patent application no. 10 2013 226 754.1 filed on Dec. 19, 2013, the contents of which are fully incorporated herein by reference.

TECHNICAL FIELD

Exemplary embodiments relate to a lifting column.

BACKGROUND

Lifting columns are used in many fields of technology. Using a lifting column, an object or a device can be brought into different positions. Conventional lifting columns usually have a maximum possible vertical lift (stroke or stroke length) that depends on a smallest possible height of the lifting column. The vertical lift of the lifting column is usually smaller than the smallest height of the lifting column in a retracted state. For many devices, for example, operating tables, stretchers, presentation tables, or dentists' chairs, it is necessary that these have a very low height in a first position. These devices should be driven to a high position in a second position. For this purpose, lifting columns are necessary that have a very low height and a large vertical lift. Conventional lifting columns having a low height and a vertical lift that is larger than this height often have a very expensive and complex construction. Furthermore, a high noise level can also often occur with these lifting columns. The reason for this can possibly be, if provided, a drive device, a gear drive, or a transmission of the lifting column.

SUMMARY

A need therefore exists to improve a compromise between the height and the vertical lift (stroke or stroke length) of a lifting column. Furthermore, an adjustment of the lifting column with a lowest-possible noise level should be made possible.

Exemplary embodiments relate to a lifting column which includes a component having an internal thread. The lifting column further comprises a hollow shaft. The hollow shaft has an external thread which is in engagement with the internal thread. An internal thread is also formed on the hollow shaft. The hollow shaft further comprises a threaded spindle. The threaded spindle is disposed inside the hollow shaft. An external thread of the threaded spindle is in engagement with the internal thread of the hollow shaft. The lifting column also has a drive device. This is configured in order to rotate the hollow shaft relative to the threaded spindle and the component. During a rotation of the hollow shaft, the component and the hollow shaft are movable in the same axial direction so that the height of the lifting column is changeable.

Since the lifting column comprises a threaded spindle disposed inside the hollow shaft, and the component and the hollow shaft are movable in the same axial direction during a rotation of the hollow shaft, the height of the lifting column is changeable. For example, it can be achieved that, using the lifting column, a vertical lift (stroke or stroke length) can be realized that is larger than the height of the lifting column in a retracted state. Furthermore, this can optionally be made possible using a very simple construction of the drive unit and transmission unit of the lifting column. Thus a reduction of a noise level during an adjusting of the lifting column can possibly also be achieved.

Here, a component having an internal thread can be any component that is suitable for being in engagement with the external thread of the hollow shaft. For example, the component can be a threaded nut or a threaded-nut system. Here, a threaded spindle disposed inside the hollow shaft can be disposed in a radially inner-lying region of the hollow shaft. For example, the threaded spindle can be arranged concentric with a bore of the hollow shaft. Furthermore, a longitudinal axis of the threaded spindle can be oriented parallel to a longitudinal axis of the hollow shaft. For example, the hollow shaft can rotate about its longitudinal axis. Here, the internal thread of the hollow shaft can optionally be any internal thread that is formed to be in engagement with the external thread of the threaded spindle. For example, the internal thread can be formed on a threaded nut or a threaded-nut system which is connected to the hollow shaft.

In the following, the height of the lifting column shall be an extension of the lifting column in a direction in which the vertical lifting of the lifting column occurs. Expressed in other words, the height of the lifting column is the direction in which the lifting column can be lengthened and/or shortened.

In addition, the lifting column according to an exemplary embodiment comprises at least two telescopic tubes. In some exemplary embodiments it can thereby be effected that in an extended state the drive device as well as the hollow shaft are covered at least sectionally by the telescopic tubes. For example, the telescopic tubes can have a similar cross-section. A telescopic tube having a smallest cross-section can optionally be disposed in a telescopic tube having a larger cross-section. Additionally or alternatively, the telescopic tubes can be disposed concentric with one another. The telescopic tube having the largest cross-sectional area can optionally be connected to a base plate. This could possibly serve for attaching the lifting column to a subsurface.

In some further exemplary embodiments, the telescopic tube having the smaller cross-section includes a cover plate. This can optionally serve for attaching the surface or device to be lifted. Additionally or alternatively, the surface or device to be lifted can also be attached directly to an axial end of the telescopic tube having the smallest cross section, which axial end faces away from the base plate.

In some further exemplary embodiments, the lifting column comprises a plurality of telescopic tubes. It can thereby optionally be effected that the lifting column can have a vertical lift that is larger than the minimum height. This can be possible, for example, since all telescopic tubes can be moved one-into-another. For example, the lifting column can include a third telescopic tube which is disposed between the first telescopic tube having the larger cross-section and the second telescopic tube having the smaller cross-section. The third telescopic tube can have a cross-section that is smaller than the cross-section of the telescopic tube that is connected to the base plate. The third telescopic tube can optionally also have a cross-section that is greater than the cross-section of the telescopic tube that is disposed in the third telescopic tube. Additionally or alternatively, the third telescopic tube can be disposed in a rotationally-fixed manner with respect to the two other telescopic tubes.

In some further exemplary embodiments, the threaded spindle is connected in a rotationally-fixed manner to the telescopic tube having the largest cross-section. Additionally or alternatively, the threaded spindle can also be connected to the cover plate. Furthermore, the component can be connected in a rotationally-fixed manner to the telescopic tube having the smallest cross-sectional area. Since these components are connected to one another in a rotationally-fixed manner, it can be effected, for example, that when the hollow shaft rotates, the component and the hollow shaft are movable in the same direction. In other words, it can thus possibly be achieved that the hollow shaft and the component can be moved simultaneously. The internal thread of the hollow shaft can spirally move along the external thread of the threaded spindle possibly at the same time when the internal thread of the component spirally moves along the external thread of the hollow shaft.

In some further exemplary embodiments, the plurality of telescopic tubes is guided one-into-another such that they are disposed in a rotationally-fixed manner with respect to one another due to their circumferential shape. Further elements that position the telescopic tubes in a rotationally-fixed manner with one another can thereby be omitted, for example. The telescopic tubes can, for example, be moved with respect to one another only in the axial direction.

In some further exemplary embodiments, the telescopic tubes have a substantially rectangular cross-section. Depending on the application, the telescopic tubes can also have any other similar cross-section that precludes a rotational movement of the telescopic tubes with respect to one another. Such cross-sections can be, for example, quadrangular, triangular, polygonal and/or oval cross-sections, etc.

Additionally or alternatively, the component and the threaded spindle can also be disposed in a rotationally-fixed manner with respect to each other via components other than the telescopic tubes. It can thereby be made possible, for example, that the telescopic tubes can be omitted.

In some further exemplary embodiments, the drive device is disposed within an axial extension of the hollow shaft. It can thereby optionally be made possible that the lifting column has a very low installation height. This can optionally be possible since the drive device is not disposed axially above or axially below or axially adjacent to the hollow shaft or the threaded spindle. It can thereby be made possible, for example, that the lifting column has a length or height that corresponds at most to the length of the threaded spindle or the length of the hollow shaft. The drive device thus requires no additional installation space in the axial direction since it is disposed radially adjacent to the hollow shaft. The drive device can be disposed concentric with the threaded spindle. For example, the drive device or the motor can be pushed concentrically onto the threaded spindle. A rotor of the drive device can be connected to the hollow shaft.

In some further exemplary embodiments the drive device is a hollow-shaft motor. It can thus be made possible in a simple manner, for example, that the drive device is disposed within an axial extension of the hollow shaft. For example, the rotor of the hollow-shaft motor can be attached to the hollow shaft. In some circumstances it can thus optionally be made possible that the drive device rotates the hollow shaft relative to the threaded spindle and the component.

In some further exemplary embodiments, the hollow shaft is the rotor. It can thereby be made possible that an installation space of the lifting column is reduced in the radial direction. The lifting column can thus be formed with a relatively small diameter.

In some further exemplary embodiments, a stator of the hollow-shaft motor is attached to a telescopic tube. For example, the stator can be attached to the third telescopic tube, which is disposed between two other telescopic tubes.

The stator can thus be fixed to another non-rotating component as a non-rotating component.

In some further exemplary embodiments, the stator is configured in order to be moved together with the hollow shaft in an axial direction during an axial movement of the hollow shaft. It can thereby optionally be made possible that a driving force is maintained even if the hollow shaft is moved along an axial length that is greater than the axial extension of the stator. For example, a stator can thus be provided having a relatively small axial extension.

Alternatively the stator can be disposed immobile in an axial direction with respect to the threaded spindle. In this case the stator can have a length, for example, which corresponds at least to a length of maximum possible axial movement of the hollow shaft. Thus it can also be effected, for example, that during a vertical lift the rotor cannot move out of the region of the stator and the magnetic fields generated thereby.

In some further exemplary embodiments, the drive device is an electronically commutated hollow-shaft motor. Such a motor can optionally make possible that the lifting column achieves a higher lifting speed and a greater lifting force, as compared to a lifting column having the same cross-section that includes a hollow-shaft motor driven by alternating current. Additionally or alternatively, noise emission can optionally also be reduced. In comparison to a mechanically commutated motor, for example, such a motor makes possible a lower or shorter installation height.

Additionally or alternatively, in the lifting column according to an exemplary embodiment, the external thread and the thread of the threaded spindle can have the same direction of rotation. As a result, it can optionally be made possible in a simple manner that the component and the hollow shaft move in the same axial direction when the hollow shaft is rotated.

Additionally or alternatively, in some exemplary embodiments, the external thread of the hollow shaft and the thread of the threaded spindle can have the same pitch. It can thus optionally be made possible that the component and the hollow shaft are moved by the same distance in the axial direction during a rotation of the hollow shaft.

In order to optionally achieve a translational movement of the component and the hollow shaft relative to each other, the hollow shaft and the threaded spindle can optionally have threads with different pitches. For example, the ratio between the pitches of the threaded spindle and of the hollow shaft can be such that the hollow shaft travels a greater distance than the component. Alternatively the ratio of the pitches to each other can be such that the component travels a greater distance than the hollow shaft.

In some further exemplary embodiments, the lifting column comprises a further component having an internal thread that is in engagement with the external thread of the lifting column. This further component can optionally be connected to a further telescopic tube which is disposed in a rotationally-fixed manner with respect to the threaded spindle. It can thus be made possible, for example, that the component is also disposed in a rotationally-fixed manner with respect to the threaded spindle. The first component, the second component, and the hollow shaft can optionally move in the same axial direction during a rotation of the hollow shaft. It can thereby be effected, for example, that an even greater vertical lift can be carried out in comparison with the smallest possible installation height of the lifting column in a retracted state.

In some further exemplary embodiments, the lifting column can include a plurality of components, each having an internal thread, which internal threads are in engagement with the external thread of the hollow shaft. Thus, for example, the possible vertical lift can be extended even further in comparison to a smallest possible installation height. For example, the lifting column can include four, five, six, seven, eight, or more components, each having an internal thread that is in engagement with the external thread of the hollow shaft. For example, each of these components can be connected to a telescopic tube. Thus, for example, a multiply-telescopic lifting column can be provided.

The above-mentioned effects of individual features or exemplary embodiments are merely exemplary effects. Of course, alternative or additional effects can result.

BRIEF DESCRIPTION OF THE DRAWINGS

Further advantageous embodiments are described in more detail below with reference to exemplary embodiments depicted in the drawings, but are not limited to said exemplary embodiments.

FIG. 4 shows a schematic depiction of a side view of a lifting column according to a further exemplary embodiment.

DETAILED DESCRIPTION

Figure 1:
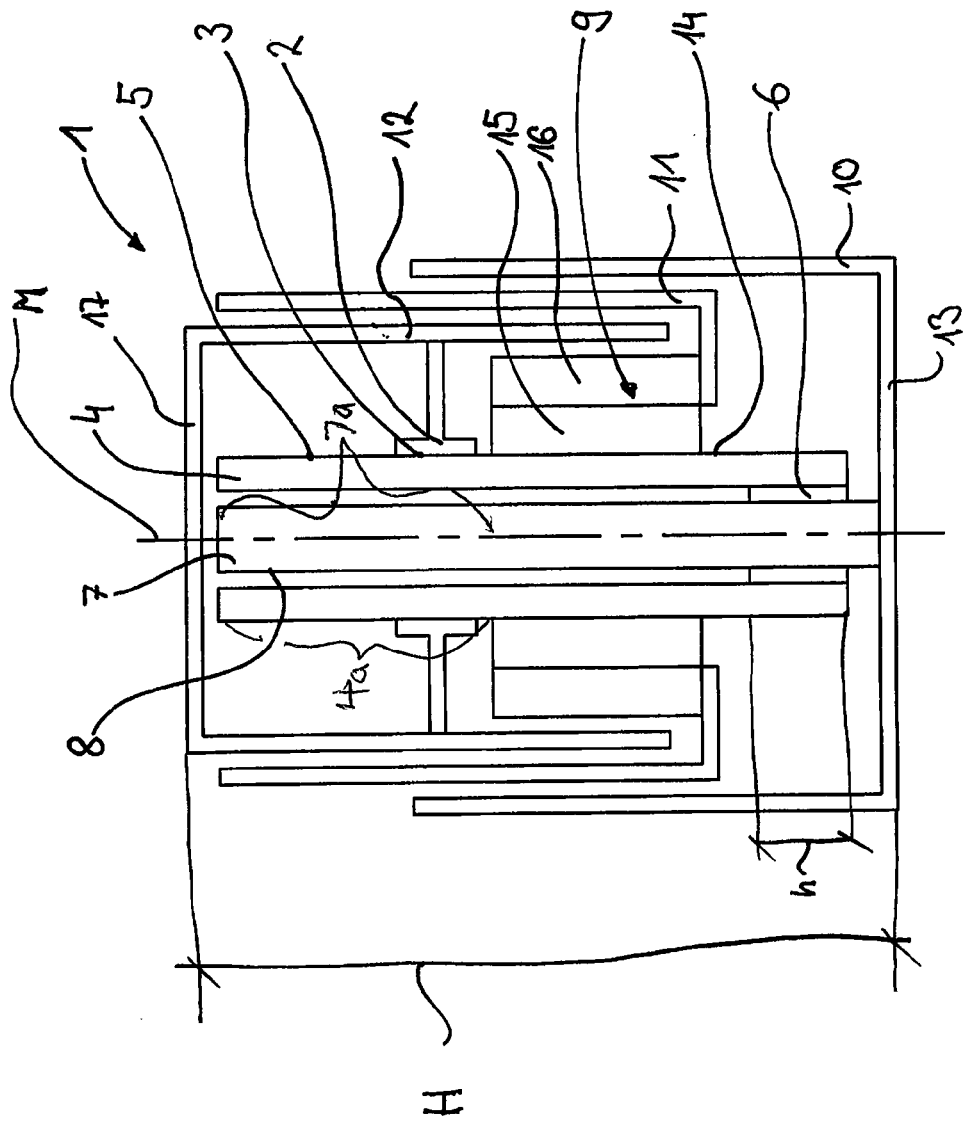
FIG. 1 shows a schematic depiction of a side view of a lifting column according to an exemplary embodiment.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIG. 1 shows a schematic depiction of a side view of a lifting column according to an exemplary embodiment.

A lifting column 1 shown in FIG. 1 comprises a component 2 having an internal thread 3. Furthermore, the lifting column 1 includes a hollow shaft 4. The hollow shaft 4 has an external thread 5. The external thread 5 is in engagement with the internal thread 3 of the component 2. The hollow shaft 4 also has an internal thread 6. The lifting column 1 also comprises a threaded spindle 7. The threaded spindle 7 has an external thread 8. The external thread 8 of the threaded spindle 7 is in engagement with the internal thread 6 of the hollow shaft 4. The lifting column further comprises a drive device 9. The drive device 9 is configured in order to rotate the hollow shaft 4 relative to the threaded spindle 7 and the component 2. During a rotation of the hollow shaft 4, the component 2 and the hollow shaft 4 are movable in the same axial direction. A height H of the lifting column 1 thereby changes.

The component 2 has a greater extension in the radial direction than a hollow-shaft motor with which the lifting column 1 is driven. In some exemplary embodiments, sufficient space for accommodating the drive can be created thereby. The component 2 has a smaller extension in the axial direction than the threaded spindle 7 and/or than the hollow shaft 4, for example smaller by a factor of 1.5, 2, 3 4, 5, 6, 7, 8, 9, 10 or the like. The threaded spindle 7 is formed solid. In some further, not-shown exemplary embodiments, the threaded spindle can also be formed as a hollow shaft.

In the exemplary embodiment of FIG. 1, the hollow shaft 4 and the threaded spindle 7 are disposed parallel to a longitudinal axis M. The hollow shaft 4 rotates about the longitudinal axis M. According to the exemplary embodiment of FIG. 1, the lifting column 1 further comprises a first telescopic tube 10. A second telescopic tube 11 is disposed in the first telescopic tube 10. The second telescopic tube 11 is guided in the first telescopic tube 10. For this purpose the first telescopic tube 10 has a greater cross-sectional area than the second telescopic tube 11. The first telescopic tube 10 has a cross-sectional area which is similar to a cross-sectional area of the second telescopic tube 11. A third telescopic tube 12 is guided in the second telescopic tube 11. The third telescopic tube 12 has a smaller cross-sectional area than the second telescopic tube 11. The cross-sectional area of the third telescopic tube 12 is similar to the cross-sectional area of the second telescopic tube 11.

In further, not-shown exemplary embodiments, the telescopic tubes can have cross-sectional areas which are not similar to one another and/or do not effect a rotationally-fixed guiding of the telescopic tubes with respect to one another. In these cases the telescopic tubes can optionally be guided, or can be designed so as to be rotationally-fixed, with respect to each other using other means.

The first telescopic tube 10 is connected to a base plate 13. The base plate 13 can serve, for example, for attaching the lifting column 1 to a not-depicted subsurface. In the exemplary embodiment of FIG. 1, the threaded spindle 7 is attached to the base plate 13 in a rotationally-fixed manner. The threaded spindle 7 is thereby also disposed in a rotationally-fixed manner with respect to the first telescopic tube 10. Consequently the threaded spindle 7 is also disposed in a rotationally-fixed manner with respect to the other telescopic tubes 11 and 12.

The external thread 8 of the threaded spindle 7 is formed on the threaded spindle 7 in an axial direction along the axis M over an entire length of the threaded spindle 7. However, the internal thread 6 of the hollow shaft 4, which is in engagement with the external thread of the threaded spindle 7, is formed only sectionally (in one section) in a small region of the axial extension of the hollow shaft 4. For example, the internal thread 6 can have a height h that is sufficient to guide the hollow shaft 4 along the threaded spindle 7. However, in the present embodiment the height h can be small enough to keep friction to a minimum. For example, the ratio of the height h of the internal thread 6 of the hollow shaft 4 to the height H of the lifting column 1 (i.e. the ratio h/Hi can be smaller than 1/2, 1/5, 1/10, or even 1/20. Optionally the internal thread 6 can be a threaded nut or a threaded-nut system. The internal thread 6 of the hollow shaft 4 is disposed at a region or end of the hollow shaft 4 which faces (is closest to) the base plate 13.

In some further, not-depicted exemplary embodiments, the internal thread of the hollow shaft can be formed in an interrupted manner or at least partially evenly distributed on a radially-inner region of the hollow shaft. Alternatively the hollow shaft can have an internal thread along its entire length.

The drive device 9 can be an electric motor. In the exemplary embodiment of FIG. 1, the drive device 9 is a hollow-shaft motor. The drive device 9 is disposed such that it lies outside an area of an axial extension 7a of the threaded spindle 7 and an axial extension 4a of the hollow shaft 4. A low installation height of the lifting column 1 can thereby optionally be made possible, since the drive device 9 does not require additional installation space in the axial direction with regard to the length of the threaded spindle 7. A rotor 15 of the drive device 9 is attached to a circumferential surface 14 of the hollow shaft 4, which circumferential surface 14 faces radially outward.

In further, not-depicted exemplary embodiments, the hollow shaft itself can be formed as a rotor.

A stator 16 of the drive device 9 is attached to the second telescopic tube 12. The stator 16 is thus disposed in a rotationally-fixed manner with respect to the threaded spindle 7. The external thread 5 of the hollow shaft 4 can be formed, for example, above a region in which the rotor 15 is attached. For example, the external thread 5 could be formed only in the region of the hollow shaft 4, which region moves relative to the component 2. A manufacturing of the hollow shaft 4 can thereby optionally be simplified.

In further, not-depicted exemplary embodiments the hollow shaft can include an external thread which is formed along the entire circumferential surface.

The component 2, the internal thread 3 of which engages in the external thread 5, is connected to the telescopic tube 12 in a rotationally-fixed manner. The third telescopic tube 12 is guided on the hollow shaft 4 exclusively by the component 2. The component 2 is thereby disposed in a rotationally-fixed manner with respect to the threaded spindle 7 and the telescopic tubes 10, 11, and 12.

The third telescopic tube 12 is closed in the axial direction by a cover plate 17. This can serve, for example, for attaching, abutting, or as contact for a device to be lifted or to be supported.

In some further, not-depicted exemplary embodiments, the lifting column 1 includes no cover plate 17 or attachment plate. In these cases the devices to be lifted or supported can be connected directly to the telescopic tube via screws.

Using the assembly described, it can optionally be effected that when the hollow shaft 4 is driven by the drive device 9, the hollow shaft 4 rotates about the axis M. In one corresponding direction of rotation, the hollow shaft 4 moves upward, away from the base plate 13. For this purpose the internal thread 6 spirally moves along the external thread 8 of the threaded spindle 7. Since the component 2 is disposed in a rotationally-fixed manner with respect to the third telescopic tube, it simultaneously moves along the axis M relative to the hollow shaft 4 away from the cover plate 13. This occurs in addition to the vertical lifting, which is carried out since the hollow shaft 4 moves away from the cover plate 13 in the axial direction. Double the vertical lifting length can thus optionally be achieved with the same installation height. In order to effect the rotation of the hollow shaft 4, a magnetic field can be generated by the stator 16. This causes the rotor 15, which is attached to the hollow shaft 4, to rotate.

In further, not-depicted exemplary embodiments, the hollow shaft 4 can be rotated directly if it is formed as a rotor. The extension of the lifting column 1, for example, can thereby be effected.

In order to effect the retraction of the lifting column 1, the hollow shaft 4 is rotated in the other, opposite direction. For this purpose the drive device 9 is driven in the opposite direction. A corresponding magnetic field is generated by the stator 16. The component 2 and the hollow shaft 4 then move simultaneously towards the base plate 13.

In some exemplary embodiments, the drive device is configured as a hollow-shaft direct-current motor. A large lifting force can thereby optionally be generated in addition to the small installation space in the radial and axial directions. For example, the hollow-shaft direct-current motor can be electronically commutated. Thus, for example, an especially low-noise lifting column can be provided.

Figure 2:
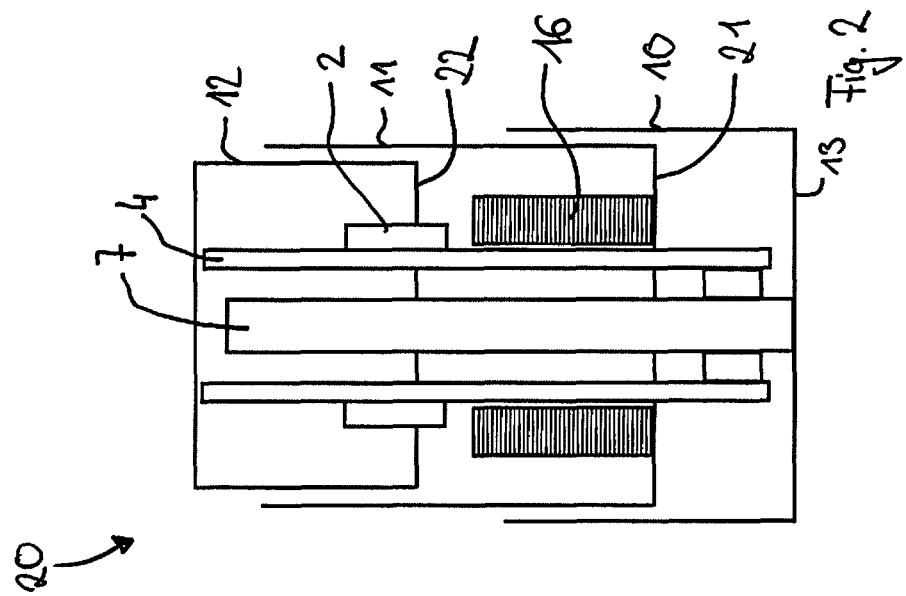
FIG. 2 shows a schematic depiction of a side view of a lifting column according to a further exemplary embodiment in a retracted position.

FIG. 2 shows a schematic depiction of a side view of a lifting column according to a further exemplary embodiment in a retracted position.

A lifting column 20 shown in FIG. 2 is configured substantially analogous to the lifting column 1. Like the lifting column 1, the lifting column 20 comprises a hollow shaft 4, a threaded spindle 7, and a drive device. The drive device of the lifting column 20 differs from the drive device 9.

In the lifting column 20 the hollow shaft 4 is formed as a rotor. A stator 16 and/or its windings are disposed on the second telescopic tube 11. The second telescopic tube 11 comprises a base 21. The stator 16 can optionally be fixed in the radial direction on the base 21 of the telescopic tube 11. The stator 16 is held in the axial direction by the base 21. In this way the stator 16 can be moved with the telescopic tube 11 when the second telescopic tube 11 is moved in an axial direction.

The third telescopic tube 12 also comprises a base 22. The component 2 is attached or flush-mounted to the base 22 of the third telescopic tube 12. In this way a simple connection between the second component 2 and the third telescopic tube 12 can be effected. The component 2 can thus also be disposed in a rotationally-fixed manner relative to the threaded spindle 7. In FIG. 2 the lifting column 20 is depicted in a refracted position.

Figure 3:
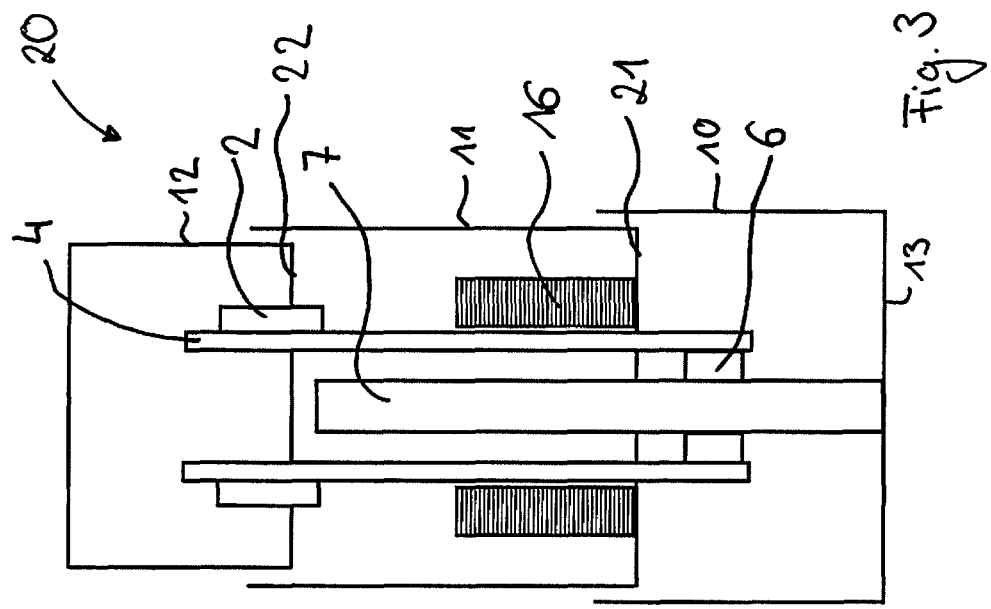
FIG. 3 shows a schematic depiction of a side view of the lifting column according to FIG. 2 in an extended position.

FIG. 3 shows a schematic depiction of a side view of the lifting column 20 according to FIG. 2 in an extended position.

In order to extend the lifting column 20, the hollow shaft 4 is rotated, as described for the lifting column 1. Here the component 2 is located at an upper end of the hollow shaft 4, which upper end faces away from the base plate 13. The internal thread 6 of the hollow shaft 4 is also spaced farther away from the cover plate 13 than in a refracted state.

In other words, according to the lifting columns of the exemplary embodiments, the vertical lift is greater than the retracted height of the lifting column. Thus, by using the lifting column according to the present disclosure, the vertical lift can have a greater length than the height of the lifting column in its retracted state. Thus, a lifting column according to at least one of the exemplary embodiments can be used in a variety of applications, such as operating tables, presentation tables, dentists' chairs and the like. Since the lifting column can have such a small height, the above-mentioned devices can be placed, for example, in a first very deep position. This can facilitate, for example, moving patients, e.g., out of a dentists' chair or a stretcher. Furthermore, due to the relatively large vertical lift, the above-mentioned devices can be displaced by a large height into a second position. In this high position, an operation or treatment or presentation can optionally be performed. The lifting column is suitable, for example, for all applications that require a low retracted height and a large vertical lift. Thus, previously-known lifting columns, which employ motors and solid shafts, or two screws which are disposed parallel to each other, or other mechanically complex constructions which are based on chains or cables, can be replaced with the designs according to the exemplary embodiments.

The limited space in the axial direction can be used, for example, by a system including two components or a plurality of components, each having an internal thread, which can be moved simultaneously. The drive train, i.e. the combination of the transmission gearing and the drive, can optionally be constructed in such a manner that the rotor of the electric motor is connected to the hollow shaft. The hollow shaft (e.g. tube) can have a first internal thread or a first threaded-nut system. The hollow shaft can have a thread on the outside of the tube facing radially outward. A second threaded-nut system can move along this thread on the outside of the hollow shaft. In this way a very compact and telescopic construction can optionally be made possible, in which both threaded-nut systems can be moved at the same time. This synchronous process of the two threaded-nut systems can optionally make possible an improvement with regard to the noise level and a visual appearance of the lifting column. This can be the case, for example, if a plurality of lifting columns is used in an application. For example, using the lifting column according to the exemplary embodiment, a simplified construction can be made possible in comparison to conventional lifting columns which comprise gear drives, belts, or other elements that are driven by a motor. This may be optionally desirable since these conventional components usually produce noise or undesirable sounds, which can be disruptive in many applications. The lifting column according to the exemplary embodiment can enable, for example, a telescopic extending of the lifting column and a low noise level with a small number of individual components and a simple construction.

Expressed in other words, exemplary embodiments relate to a construction for a telescopic lifting column that comprises one, two, or more screws or nuts or components having an internal thread. This lifting column can optionally also comprise a hollow-shaft motor. Thus, for example, a lifting column having a larger vertical lift than a smallest refracted height can be provided.

FIG. 4 shows a schematic depiction of a side view of a lifting column according to a further exemplary embodiment.

A lifting column 30 shown in FIG. 4 comprises, in an analogous manner to the lifting columns of the other exemplary embodiments, a plurality of telescopic tubes 10, 11, and 12 which are displaceable relative to one another. In order to effect the displacement, the lifting column 30 comprises a drive device 9. The drive device 9 is a hollow-shaft motor. A rotor 15 of the hollow-shaft motor is attached to a hollow shaft 4.

In some further exemplary embodiments, the hollow shaft can itself be configured as a rotor.

A stator 16 of the hollow-shaft motor is attached to the telescopic tube 12. The telescopic tube 12 can be retracted into or extended out from the other telescopic tube 10. The rotor 16 is attached to a hollow shaft 4 which is rotatably supported by a threaded spindle 7. The threaded spindle 7 is disposed in a rotationally-fixed manner with respect to the telescopic tubes 10, 11, and 12. For this purpose the threaded spindle 7 is attached to a base plate 13. A cover plate 17 is connected to the telescopic tube 10.

The threaded spindle 7 has an external thread 8. An internal thread 6 of the hollow shaft 4 engages in the external thread 8. When the hollow shaft 4 is driven by the drive device 9, it rotates such that the internal thread 6 of the hollow shaft 4 moves along the external thread 8 of the threaded spindle 7 in the axial direction. Here, to extend the lifting column 30, the hollow shaft 4 spirally moves away from the cover plate 13 or against an acting weight force. To retract the lifting column 30, the hollow shaft 4 is moved in the other direction. Here a vertical lift can optionally be achieved that corresponds to a length of the threaded spindle 7 and thus to a maximum height of the lifting column 30. For example, a telescopic lifting column 30 can be provided by the lifting column 30 which has a greater mechanical power than a lifting column that includes an alternating-current hollow-shaft motor and an identical cross-section. Furthermore, a speed during moving of the lifting column 30 can be controlled more easily using an electronically commutated hollow-shaft motor than using a hollow-shaft motor which is driven by alternating current. Furthermore, a retraction- and/or extension-speed of the lifting column 30 can also be increased. The lifting column 30 thus comprises the internal thread 6 as a threaded-nut system that is disposed in a hollow shaft 4, which can be moved along a threaded spindle having an external thread. The hollow shaft 4 is driven by an electronically commutated direct-current hollow-shaft motor.

In other words, a greater lifting power, a higher lifting speed, a lower installation height, and/or a lower noise level of the drive system can be made possible by the lifting column 30 having an electronically commutated direct-current motor. This can be possible, for example, since the use of gears can be eliminated. Since an electronically commutated hollow-shaft motor is used, significantly more power can be provided, for example, than with a conventional alternating-current motor. Furthermore, a lower installation height in combination with a lower noise level can optionally be effected.

A lifting column according to one of the exemplary embodiments can optionally be used in all possible drive- and lifting-applications. For example, the lifting column can be used for adjusting operating tables, stretchers, presentation tables, and/or dentists' chairs, etc.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Lifting column
2 Component
3 Internal thread
4 Hollow shaft
5 External thread
6 Internal thread
7 Threaded spindle
8 External thread
9 Drive device
10 First telescopic tube
11 Second telescopic tube
12 Third telescopic tube
13 Base plate
14 Circumferential surface
15 Rotor
16 Stator
17 Cover plate
20 Lifting column
21 Base
22 Base
30 Lifting column
M Axis
H Height
h Internal-thread height

I claim:

1. A lifting column comprising:
   first second and third telescopic tubes disposed one-in-another;
   a component having an internal thread;
   a hollow shaft having an external thread, which is in engagement with the internal thread of the component, and an internal thread;
   a threaded spindle disposed inside the hollow shaft and having an external thread, which is in engagement with the internal thread of the hollow shaft; and
   a hollow-shaft motor disposed between the hollow shaft and the inner surface of the third telescopic tube in a radial direction of the hollow shaft, the hollow-shaft motor including a rotor attached to the hollow shaft, the hollow-shaft motor being configured to rotate the hollow shaft relative to the threaded spindle and the component, and
   the hollow-shaft motor having a stator, wherein the stator, the second telescopic tube and the third telescopic tube each have respective lengths in the entire axial direction, the axial length of the stator being disposed within the axial length of the second telescopic tube or within the axial length of the third telescopic tube,
   wherein when the hollow shaft rotates, the component and the hollow shaft are configured to move in the same axial direction, so that the height of the lifting column is changeable.

2. The lifting column according to claim 1, wherein the hollow shaft is the rotor of the hollow-shaft motor.

3. The lifting column according to claim 1, wherein the hollow-shaft motor is an electronically commutated hollow-shaft motor.

4. The lifting column according to claim 1, wherein the external thread of the hollow shaft and the external thread of the threaded spindle have the same direction of rotation.

5. The lifting column according to claim 1, wherein the external thread of the hollow shaft and the external thread of the threaded spindle have the same pitch.

6. The lifting column according to claim 1, wherein the hollow-shaft motor has an axial length that does not extend beyond the lateral edges of the hollow-shaft.

7. The lifting column according to claim 6,
   wherein the stator of the hollow-shaft motor is fixedly attached to the second telescopic tube, and
   the second telescopic tube is disposed between the first and third telescopic tubes.

8. The lifting column according to claim 7, wherein the stator is configured to be moved in an axial direction together with the hollow shaft when the hollow shaft moves in the axial direction relative to the threaded spindle.

9. The lifting column according to claim 1, wherein the hollow-shaft motor is positioned radially alongside the hollow shaft such that the hollow-shaft motor does not extend beyond the lateral edges of the hollow shaft.

10. The lifting column according to claim 9, wherein the hollow shaft is the rotor.

11. The lifting column according to claim 9, wherein the stator of the hollow-shaft motor is attached to the second telescopic tube from among the plurality of telescopic tubes and the second telescopic tube is disposed between first and third telescopic tubes from among the plurality of telescopic tubes.

12. The lifting column according to claim 11, wherein the stator is configured to be moved in an axial direction together with the hollow shaft when the hollow shaft moves in the axial direction relative to the threaded spindle.

13. The lifting column according to claim 12, wherein the hollow-shaft motor is an electronically commutated hollow-shaft motor.

14. The lifting column according to claim 13, wherein the external thread of the hollow shaft and the external thread of the threaded spindle have the same direction of rotation.

15. The lifting column according to claim 14, wherein the external thread of the hollow shaft and the external thread of the threaded spindle have the same pitch.

16. A lifting column comprising:
    first second and third telescopic tubes disposed one-in-another;
    a hollow shaft having an external thread disposed on an outer circumferential surface thereof and an internal thread disposed on an inner circumferential surface thereof;
    a threaded spindle fixedly coupled to the first telescopic tube, the threaded spindle being disposed inside the hollow shaft and having an external thread disposed on an outer circumferential surface thereof, the external thread being threadably engaged with the internal thread of the hollow shaft; and
    a motor disposed between the hollow shaft and the inner surface of the third telescopic tube in a radial direction of the hollow shaft, the motor including a stator,
    wherein the stator, the second telescopic tube and the third telescopic tube each have respective lengths in the axial direction, the entire axial length of the stator being disposed within the axial length of the second telescopic tube or within the axial length of the third telescopic tube,
    wherein the stator is fixedly attached to the second telescopic tube or to the third telescopic tube, and a rotor fixedly attached to, or integral with, the hollow shaft, the motor being configured to rotate the hollow shaft about the threaded spindle;

wherein when the hollow shaft rotates, the second and third telescopic tubes are configured to move in the same axial direction relative to the first telescopic tube, without rotating, to change an overall height of the lifting column between an uppermost edge of the third telescopic tube and a lowermost edge of the first telescopic tube.

17. The lifting column according to claim 16, further comprising:
a projection fixedly coupled to, or integral with, the third telescopic tube and extending inward from an inner surface of the third telescopic tube, the projection having an internal thread;
wherein the external thread of the hollow shaft is threadably engaged with the internal thread of the projection; and
the stator is fixedly attached to the second telescopic tube.

18. The lifting column according to claim 16, wherein the stator is fixedly attached to the third telescopic tube.

* * * * *